US011923557B2

(12) United States Patent
Bhuiyan et al.

(10) Patent No.: US 11,923,557 B2
(45) Date of Patent: Mar. 5, 2024

(54) BATTERY PACK

(71) Applicant: BLACK & DECKER INC., New Britain, CT (US)

(72) Inventors: Mahmudul Bhuiyan, Centereach, NY (US); Abhisheka Moturu, Pikesville, MD (US); Timothy Hennesy, Baltimore, MD (US); Jason Dunthorn, Baltimore, MD (US); Michael Varipatis, Fallston, MD (US)

(73) Assignee: BLACK & DECKER INC., New Britain, CT (US)

( * ) Notice: Subject to any disclaimer, the term of this patent is extended or adjusted under 35 U.S.C. 154(b) by 234 days.

(21) Appl. No.: 17/157,464

(22) Filed: Jan. 25, 2021

(65) Prior Publication Data

US 2021/0143506 A1    May 13, 2021
US 2022/0069401 A9    Mar. 3, 2022

Related U.S. Application Data

(63) Continuation-in-part of application No. PCT/IB2019/000960, filed on Aug. 14, 2019.

(60) Provisional application No. 62/966,623, filed on Jan. 28, 2020, provisional application No. 62/718,884, filed on Aug. 14, 2018.

(51) Int. Cl.
*H01M 50/24* (2021.01)
*H01M 50/247* (2021.01)
*H01M 50/284* (2021.01)

(52) U.S. Cl.
CPC ......... *H01M 50/24* (2021.01); *H01M 50/247* (2021.01); *H01M 50/284* (2021.01); *H01M 2220/30* (2013.01)

(58) Field of Classification Search
None
See application file for complete search history.

(56) References Cited

U.S. PATENT DOCUMENTS

| 8,389,141 B2 | 3/2013 | Suzuki et al. |
| 8,852,794 B2 | 10/2014 | Laitinen et al. |
| 9,190,644 B2 | 11/2015 | Smith et al. |

(Continued)

FOREIGN PATENT DOCUMENTS

| JP | 2011049377 A | 3/2011 | |
| JP | 2018106796 A * | 7/2018 | .......... H01M 10/613 |

(Continued)

OTHER PUBLICATIONS

Machine Translation of WO-2017110036-A1 (Year: 2017).*

(Continued)

*Primary Examiner* — Gregg Cantelmo
(74) *Attorney, Agent, or Firm* — Michael Aronoff

(57) ABSTRACT

The present disclosure is directed to a battery pack comprising a housing, a plurality of battery cells, a battery cell holder holding the plurality of battery cells, a printed circuit board, a plurality of components requiring exposure, the plurality of components affixed to the printed circuit board, a plurality of adhesion holes positioned to form a boundary about the plurality of components, a low pressure molded material applied to the printed circuit board such that the plurality of components are exposed and surrounded by the low pressure molded material.

7 Claims, 5 Drawing Sheets

(56) References Cited

U.S. PATENT DOCUMENTS

| | | |
|---|---|---|
| 11,452,213 B2 | 9/2022 | Na et al. |
| 2010/0221584 A1 | 9/2010 | Reber |
| 2014/0050945 A1* | 2/2014 | Kiger ............... H01M 50/24 |
| | | 429/7 |
| 2014/0147718 A1 | 5/2014 | Furui et al. |
| 2017/0365826 A1* | 12/2017 | Varipatis ............. G06F 1/1635 |

FOREIGN PATENT DOCUMENTS

| | | |
|---|---|---|
| WO | 2016/155559 | 10/2016 |
| WO | WO-2017110036 A1 * | 6/2017 |
| WO | 2019/163549 A1 | 8/2019 |

OTHER PUBLICATIONS

Machine Translation of JP-2018106796-A (Year: 2018).*
International Search Report and Written Opinion issued in corresponding International Patent Application No. PCT/IB2019/000960, dated Dec. 7, 2021.
International Preliminary Report on Patentability issued in corresponding International Patent Application No. PCT/IB2019/000960, dated Dec. 30, 2021.
Extended European Search Report, EP Application No. 21153674.3, dated Jun. 9, 2021, 7 pages, EPO.

* cited by examiner

BATTERY PACK

RELATED APPLICATIONS

This application claims priority under 35 U.S.C. § 119(e) to U.S. Provisional Patent Application No. 62/966,623, filed Jan. 28, 2020, titled "Battery Pack" and claims priority under 35 U.S.C. § 120 to PCT Patent Application Number PCT/IB2019/000960, filed Aug. 14, 2019, entitled, "Power Tool System," which claims priority to U.S. Provisional Patent Application No. 62/718,884, filed Aug. 14, 2018, entitled, "Pass Through Terminal Design," which are all incorporated herein by reference.

TECHNICAL FIELD

This application relates to a battery pack and a method for manufacturing a battery pack. In one implementation, the battery pack includes a plurality of battery cells, a cell holder, and a printed circuit board coupled to the cell holder.

BACKGROUND

A removable and rechargeable battery pack includes a housing. The housing holds and includes a plurality of battery cells. The housing may also include a mechanical interface for coupling to an associated electrical device such as a power tool. The interface typically includes a plurality of slots or openings that allows battery pack electrical terminals to mechanically and electrically mate with corresponding electrical device electrical terminals. The battery cells are held together, at least in part, by a battery cell holder and electrically coupled to the battery pack electrical terminals. The battery pack also includes a printed circuit board. The printed circuit board may be coupled to the battery cell holder, simply held against the battery cell holder or floating relative to the battery cell holder. The battery pack also includes a plurality of components coupled to the printed circuit board. It is not uncommon for moisture or debris such as metal shavings to enter the battery pack housing through the plurality of slots. The moisture or debris may come into contact with the one or more of the plurality of components on the printed circuit board. This may cause short circuits or other problems with the battery pack. As such, it is desirable to encapsulate or enclose the portions of the printed circuit board to protect the components from the moisture or debris.

In order to encapsulate or enclose portions of the printed circuit board, low pressure molded (LPM) material may be used. LPM material works best if the electronics and PCB are completely encapsulated and enclosed. LPM material does not reliably adhere to exposed edges or flat surfaces. If the LPM material is not adequately adhered to the printed circuit board moisture or debris may seep in between the LPM material and the printed circuit board. This may cause damage to certain electronic components (such as resistors, integrated circuit chips, capacitors, etc.) on the printed circuit board that are encapsulated and protected by the LPM material.

The instant application describes an example battery pack for protecting various encapsulated components on a printed circuit board from moisture or debris.

SUMMARY

An aspect of the present invention includes a battery pack comprising a housing, a plurality of battery cells, a battery cell holder holding the plurality of battery cells, a printed circuit board, a plurality of components requiring exposure, the plurality of components affixed to the printed circuit board, a plurality of adhesion holes positioned to form a boundary about the plurality of components, a low pressure molded material applied to the printed circuit board such that the plurality of components are exposed and surrounded by the low pressure molded material; and the low pressure molded material having flowed through the plurality of adhesion holes.

Another aspect of the present invention includes the printed circuit board and the low pressure molded material, wherein at least a portion of a boundary of the low pressure molded material is aligned with a subset of the plurality of adhesion holes.

Another aspect of the present invention includes the printed circuit board and the low pressure molded material and the adhesion holes, wherein the adhesion holes have a diameter in a range of approximately 0.5 mm to approximately 2 mm.

Another aspect of the present invention includes the printed circuit board and the low pressure molded material and the adhesion holes, wherein the adhesion holes have a diameter of approximately 1 mm.

Another aspect of the present invention includes the printed circuit board and the low pressure molded material and the adhesion holes, wherein the distance between edges of adjacent adhesion holes is in a range of approximately 1 mm to approximately 3 mm.

Another aspect of the present invention includes the printed circuit board and the low pressure molded material and the adhesion holes, wherein the distance between adjacent edges of adjacent adhesion holes is approximately 2 mm.

An aspect of the present invention includes a battery pack comprising a housing, a plurality of battery cells, a battery holder holding the plurality of battery cells, a printed circuit board coupled to the battery holder, a plurality of elements associated with the printed circuit board, a plurality of adhesion holes positioned at least partially about the plurality of elements, a low pressure molded material applied to the printed circuit board such that the plurality of elements are exposed and the low pressure molded material flows through the plurality of adhesion holes.

Another aspect of the present invention includes the printed circuit board and the low pressure molded material, wherein a subset of the plurality of adhesion holes are positioned along a portion of a boundary of the low pressure molded material.

Implementations of this aspect may include one or more of the following features.

These and other advantages and features will be apparent from the description and the drawings.

DETAILED DESCRIPTION

Figure 1:
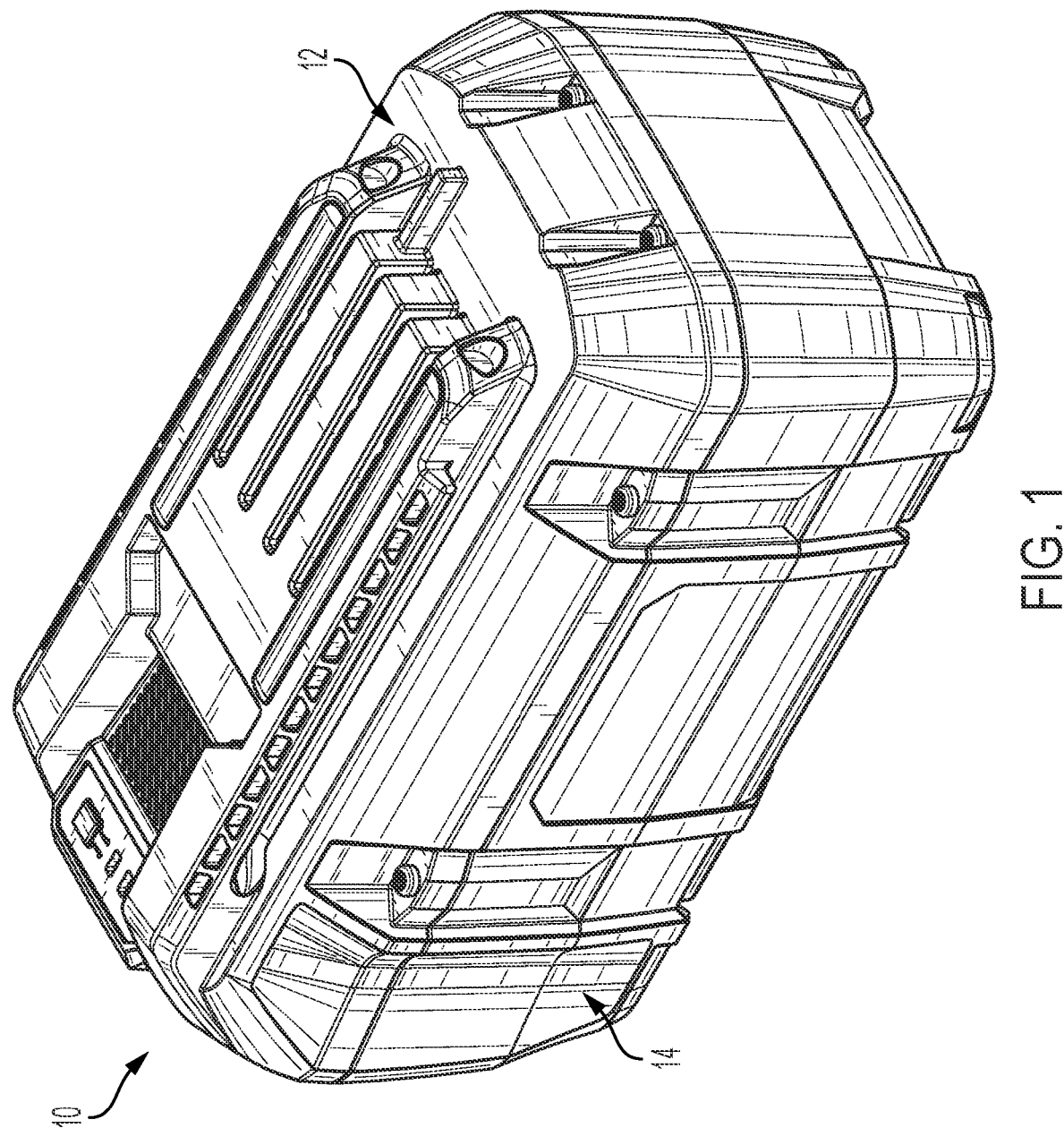
FIG. 1 is an example of a battery pack in accordance with the present invention.

Referring to FIG. 1, in an example embodiment, a battery pack 10 includes an upper housing 12 and a lower housing 14 coupled to the upper housing 12. The battery pack 10 includes a plurality of battery cells 15 and a battery cell holder 17 holding the plurality of battery cells 15. The battery pack 10 includes a mechanical interface for coupling to an associated electrical device (not shown), for example a power tool or a battery charger. The interface includes a plurality of slots for providing access to a plurality of battery pack terminals 22 (described in more detail below). The slots allow for ingress of moisture and debris.

Figure 2:
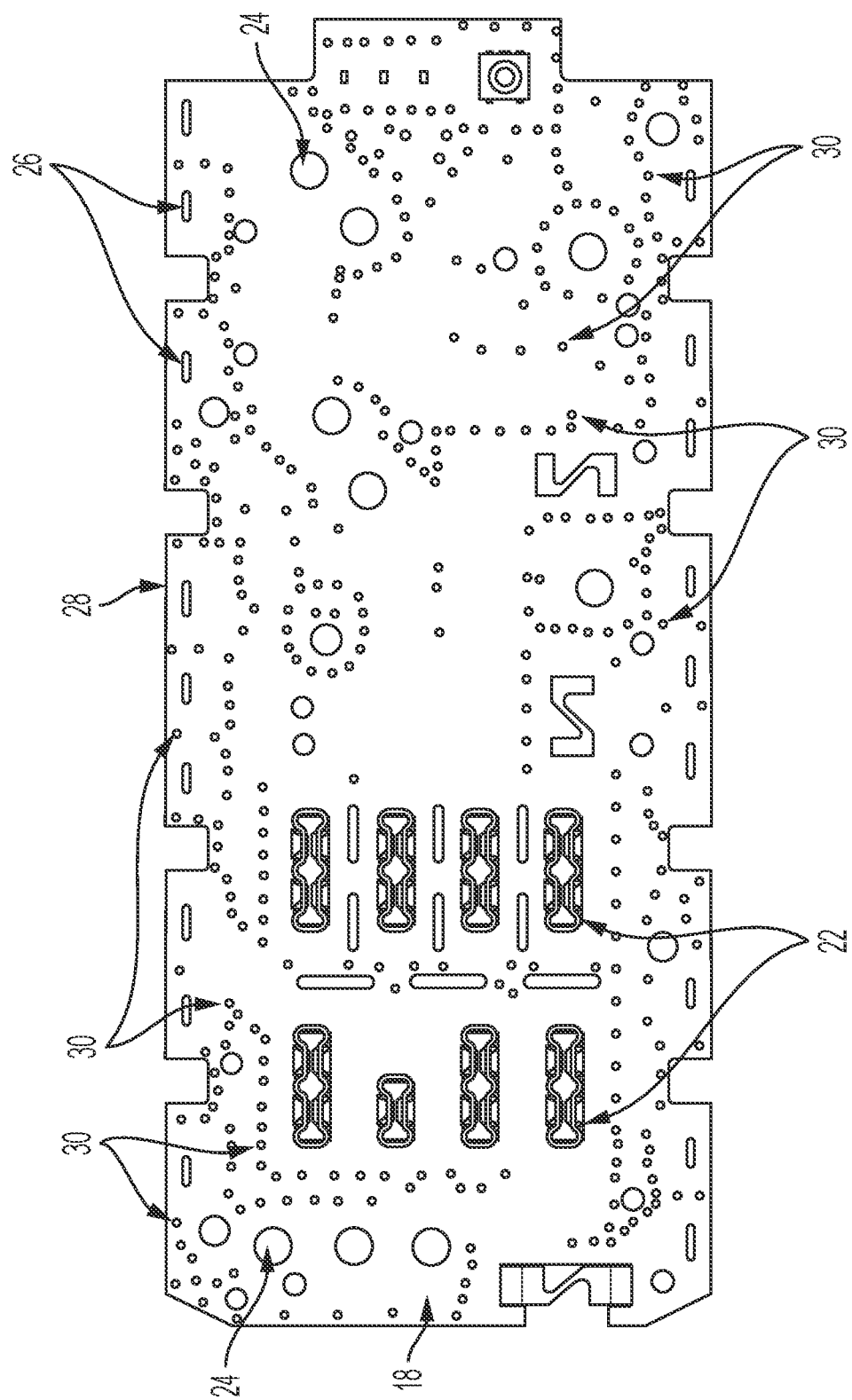
FIG. 2 is an example of a printed circuit board in accordance with the present invention.

Referring to FIG. 2, there is illustrated an example of a printed circuit board 18 in accordance with the present invention. The printed circuit board 18 may include a plurality of electronic components, such as processors, resistors and capacitors (not shown) that are susceptible to damage if contacted by moisture or debris. As such, it is desirable to encapsulate and enclose these components with LPM material 20. There are other components or features on the printed circuit board 18, such as battery pack terminals 22, test points 24, and battery strap holes 26, that must be accessible to couple or mate with other components. As such, these components and features cannot be encapsulated with LPM material 20. This results in boundaries of the LPM material 20 between components that are encapsulated and components/features that are not encapsulated.

As noted above, the LPM material 20 does not adhere well to the printed circuit board 18 exposed edges 28 or flat surfaces. To address this shortcoming, the printed circuit board 18 includes a plurality or array of adhesion holes 30. The adhesion holes 30 are positioned at the boundaries of the LPM material 20. The adhesion holes 30 enable the LPM material 20 to flow through the printed circuit board 18. As a result, the LPM material 20 wraps around the printed circuit board 18 providing improved adhesion to the printed circuit board 18.

As illustrated in FIG. 2, the adhesion holes 30 are positioned, for example, around a plurality of battery strap holes 26. Each of the plurality of battery strap holes 26 receive an end of a battery strap 32. The adhesion holes 30 are also positioned, for example, around the plurality of battery pack terminals 22. The adhesion holes 30 are also positioned, for example, around the plurality of test points 24 and the fuses 34.

Figure 3:
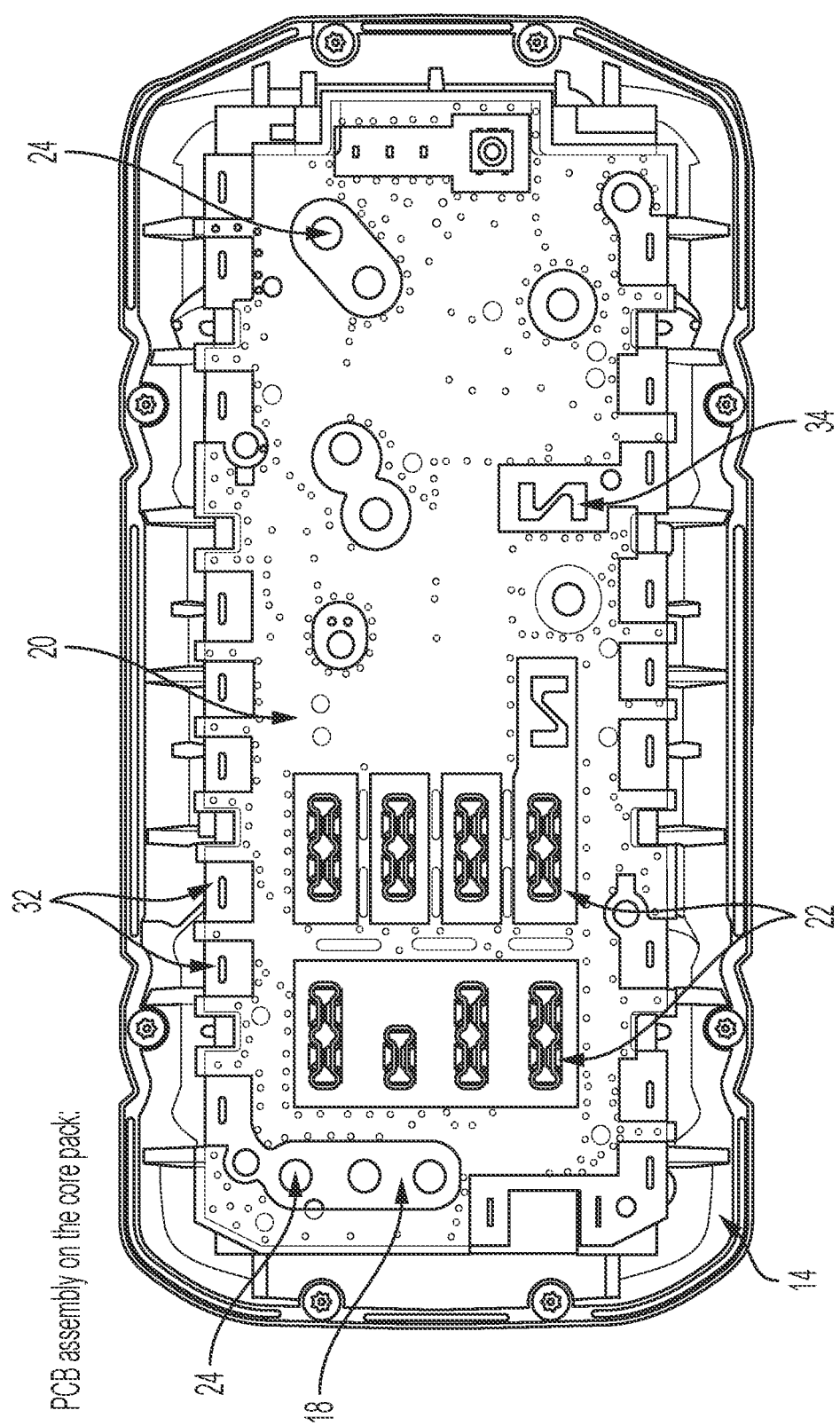
FIG. 3 is an example of a top view of a battery pack in accordance with the present invention with a top housing removed.
Figure 4:
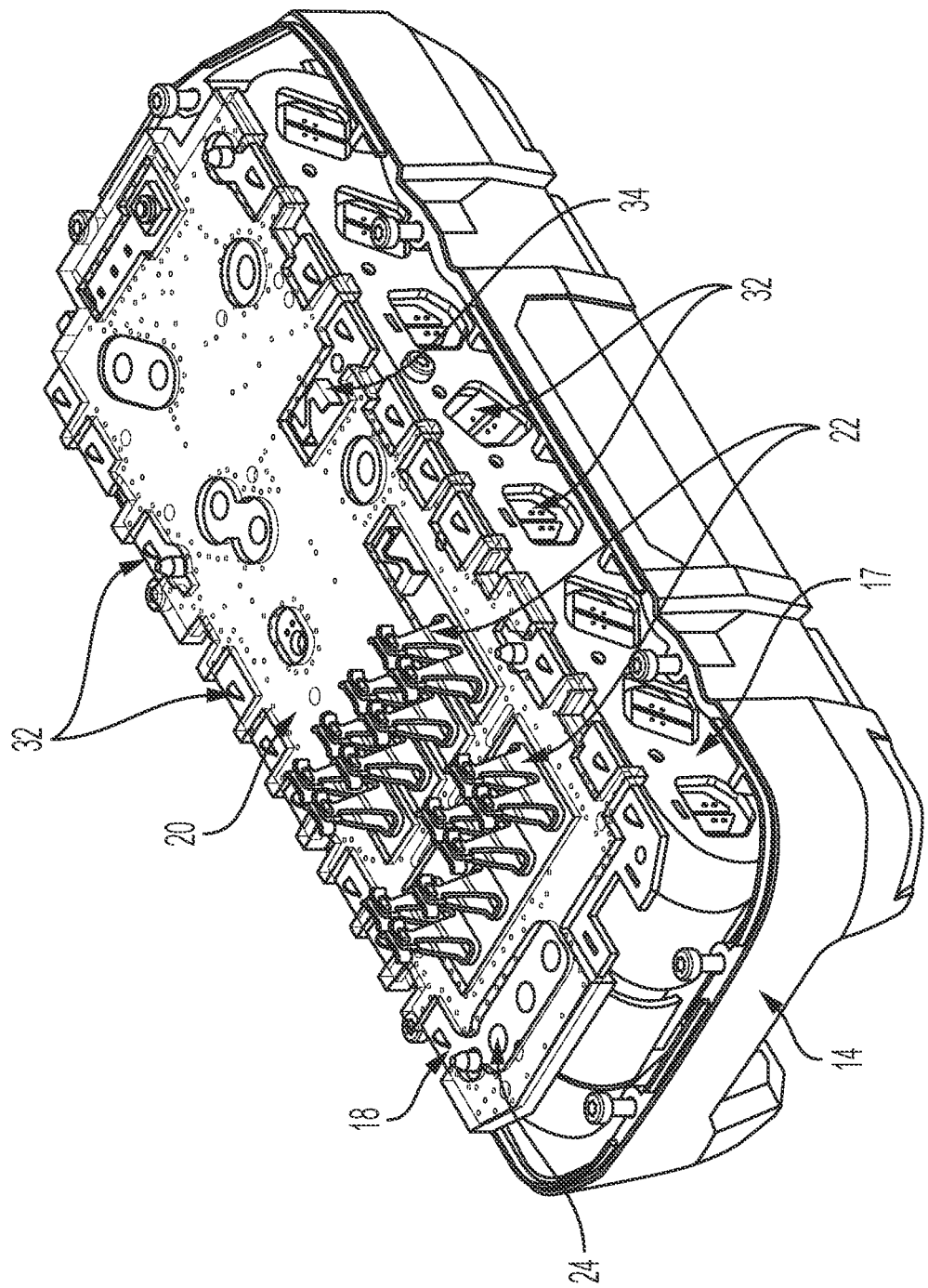
FIG. 4 is an isometric view of the battery pack of FIG. 3.
Figure 5:
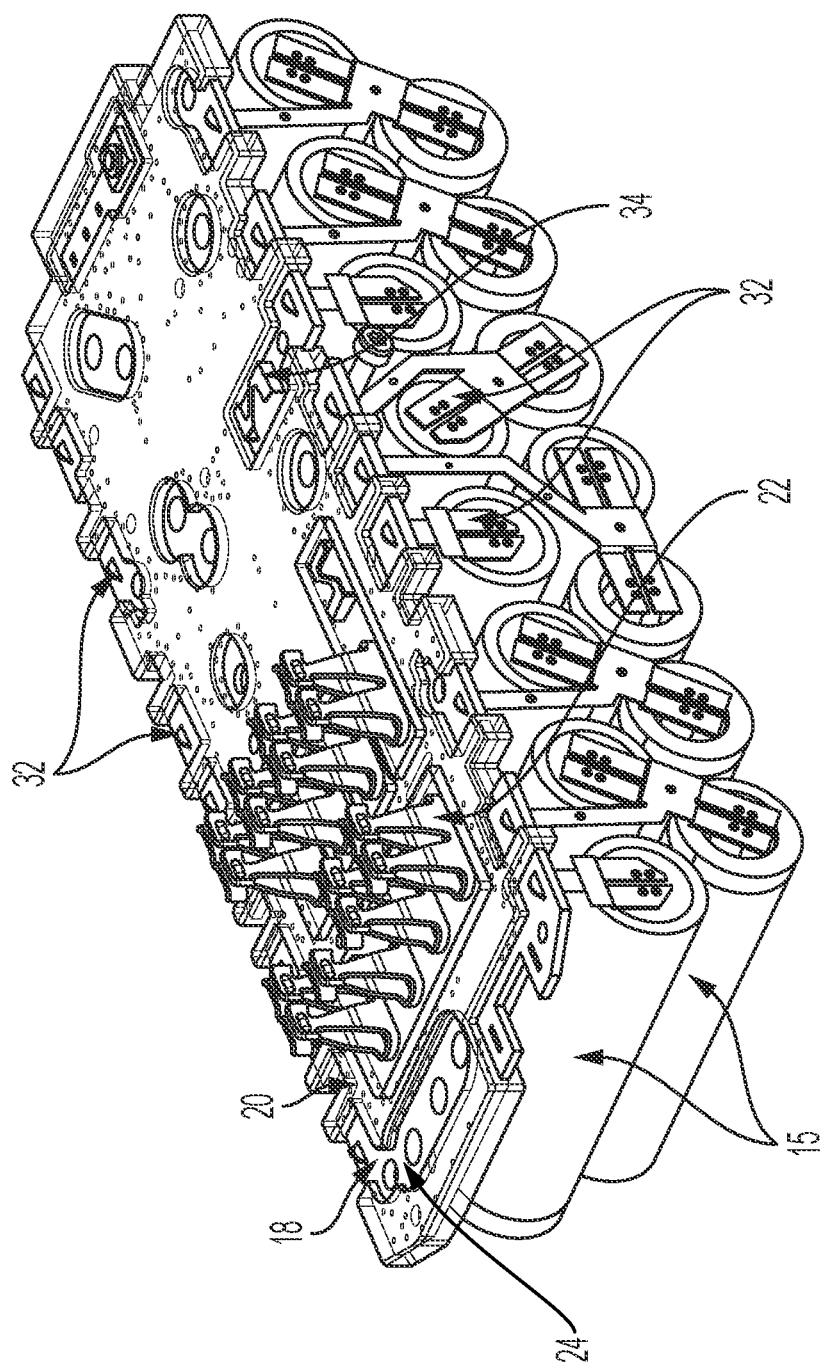
FIG. 5 is an isometric view of the printed circuit board and a plurality of battery cells of the present invention.

FIGS. 3, 4 and 5 illustrate the LPM material 20 applied to the printed circuit board 18. As illustrated, the LPM material 20 surrounds but does not encapsulate, for example, the battery strap holes 26 and the ends of the battery straps 32 that extend through the battery strap holes 26 or the battery pack terminals 22 or the fuses 34 or the test points 24. The adhesion holes 30 are positioned along the boundary or border of the LPM material 20 around the various exposed components. The positioning (positions) of the adhesion holes 30 enables the LPM material 20 to flow through the printed circuit board 18 at the boundary of the LPM material 20. This enables the LPM material 20 to grab or adhere to the printed circuit board 18. The improved adhesion of the LPM material 20 to the printed circuit board 18 prevents water and other debris from penetrating or infiltrating between the LPM material 20 and the printed circuit board 18. This prevents the water or other debris from contaminating any components encapsulated by the LPM material 20.

The plurality of adhesion holes 30 in the printed circuit board 18 allow LPM material 20 to pass from a first side of the printed circuit board 18 to a second side of the printed circuit board 18. In other words, the LMP material is able to wrap or grab the printed circuit board 18 for improved adhesion. Providing an array of periodic adhesion holes 30 along the boundaries or edges of the LPM material 20 improves adhesion of the LPM material 20 to printed circuit board 18.

In one embodiment, the adhesion holes 30 have a diameter in the range of approximately 0.5 mm to approximately 2 mm. In another embodiment, the adhesion holes 30 have a diameter of approximately 1 mm. In one embodiment, the distance between edges of adjacent adhesion holes 30 is in a range of approximately 1 mm to approximately 3 mm. In another embodiment, the distance between adjacent edges of adjacent adhesion holes 30 is approximately 2 mm.

Numerous modifications may be made to the exemplary implementations described above. These and other implementations are within the scope of this application.

The invention claimed is:

1. A battery pack comprising:
   a housing,
   a plurality of battery cells,
   a battery cell holder holding the plurality of battery cells,
   a printed circuit board,
   a plurality of components requiring exposure, the plurality of components being affixed to the printed circuit board,
   a plurality of adhesion holes positioned to form a boundary about the plurality of components, and
   a low pressure molded material applied to the printed circuit board such that the plurality of components are exposed and surrounded by the low pressure molded material; and
   the low pressure molded material having flowed through the plurality of adhesion holes.

2. The battery pack, as recited in claim 1, wherein at least a portion of a boundary of the low pressure molded material is aligned with a subset of the plurality of adhesion holes.

3. The battery pack, as recited in claim 1, wherein the adhesion holes have a diameter in a range of approximately 0.5 mm to approximately 2 mm.

4. The battery pack, as recited in claim 1, wherein the adhesion holes have a diameter of approximately 1 mm.

5. The battery pack, as recited in claim 1, wherein the distance between adjacent edges of adjacent adhesion holes is approximately 2 mm.

6. A battery pack comprising:
   a housing,
   a plurality of battery cells,
   a battery holder holding the plurality of battery cells,
   a printed circuit board coupled to the battery holder,
   a plurality of elements associated with the printed circuit board,
   a plurality of adhesion holes positioned at least partially about the plurality of elements,
   a low pressure molded material applied to the printed circuit board such that the plurality of elements are exposed and the low pressure molded material flows through the plurality of adhesion holes.

7. The battery pack, as recited in claim 6, wherein a subset of the plurality of adhesion holes are positioned along a portion of a boundary of the low pressure molded material.

\* \* \* \* \*